Patented Nov. 22, 1932

1,888,547

UNITED STATES PATENT OFFICE

FRANKLIN A. BENT, OF BERKELEY, CALIFORNIA, ASSIGNOR TO SHELL DEVELOPMENT COMPANY, OF SAN FRANCISCO, CALIFORNIA, A CORPORATION OF DELAWARE

PROCESS FOR THE REMOVAL OF NITRIC OXIDE FROM GASES

No Drawing.   Application filed May 14, 1931.   Serial No. 537,509.

This invention relates to a process for the removal of the oxides of nitrogen from admixture with a gas, especially from coke oven gas, cracked natural gas, oil gas and similar technical gas mixtures, including hydrocarbon gases.

More specifically the present invention is concerned with a new method of substantially completely removing the oxides of nitrogen, more particularly nitric oxide, from gas mixtures and depends on the irreversible reaction of nitric oxide with a reducing agent of the order of chromous compounds wherein the chromium element is capable of being oxidized to a higher degree of valence.

The presence of the oxides of nitrogen in various technical gases has been proven to be very undesirable. In coke oven gas, for example, the very small amounts of nitric oxide present are believed, in certain instances, to have caused serious explosions as a result of their interaction during the refrigeration process with various other constituents of coke oven gas, as representatives of which may be mentioned cyclic diolefines and ketones.

The processes known for the removal of nitric oxide from gas mixtures are of two main types: First, adsoprtion processes which require solid adsorbents which exert an adsorptive effect by reason of great surface, like active carbon or silica gel, which may or may not be impregnated with metals or metallic salts, and second, processes which are based on the oxidation of nitric oxide to nitrogen dioxide together with the subsequent removal of the latter substance by any of the well known methods.

My invention is distinguished from the usual processes by reason of the specifically different reaction of nitric oxide with reducing agents of the order of chromous compounds. By chromous compounds is contemplated those compounds containing divalent chromium regardless of the character of the compound as an entity. In other words, chromous salts of organic acids as well as of inorganic acids may be utilized in my process depending on the reaction conditions. The invention is not restricted to chromous salts such as chromous acetate, chromous chloride, chromous sulphate and the like as it may be desirable to use bases containing divalent chromium such as chromous hydroxide and the like. Nitric oxide reacts with chromous salts to form stable compounds which do not evolve nitric oxide either by heating or when subjected to reduced pressures. This property is characteristic of chromous salts in contrast to the divergent behavior of other metal salts with nitric oxide, as for example, the well known iron nitroso salts. The products of the reaction of nitric oxide with a chromous compound are believed to include hydroxylamine or ammonia depending on the conditions of the reaction, although I do not wish to be limited to any theory of the mechanism of the reaction.

A preferred embodiment of my invention is disclosed in the following example for illustrative purposes only:

Coke oven gas is first purified of other impurities by the customary procedure. The partially purified gas is then contacted in any efficient manner with a 5% aqueous neutral chromous sulphate solution. This operation can be performed effectively by countercurrent washing of the gas with the chromous sulphate solution or by bubbling the gas through the chromous sulphate solution. The chromous sulphate solution is cooled by means of water circulated through coils inserted in the reaction vessel, to a temperature of 25° C. or lower. The nitric oxide is substantially quantitatively and rapidly removed from the gas by this mode of operation.

It is advantageous to perform this reaction in the cold or at room temperature as increasing temperatures decrease the amount of nitric oxide taken up by the chromous salt solution. However, good results have been obtained at temperatures ranging from the freezing point to the boiling point of the chromous compound solution.

Although I have described an aqueous solution, it may be desirable at times to use other solvents of inorganic or organic character depending upon the particular chromous compound to be employed. Under certain conditions, it may be advantageous to utilize chromous compounds in the solid phase either with or without a support.

I have found that chromous compounds soluble in water yield the best results and where solutions of such compounds are employed, they may be of neutral, acid or alkaline character depending on the exigencies of the reaction conditions, although I have found that neutral solutions are best under most conditions and that acidic solutions are next best.

The concentration of the chromous compound or the manner in which the chromous compound is applied as well as the pressure employed may be varied over wide limits. Subatmospheric to superatmospheric pressures may be used depending on the particular operating conditions.

As chromous compound solutions, when used, rapidly oxidize in the air, it is necessary to preserve the reducing power of the chromous compound by the exclusion of air from the gas to be purified and from the reaction vessel. A layer of ligroin or heavy petroleum oil, or similar oxygen-excluding medium, on the surface of the chromous compound solution will protect it from oxidation by air for long periods of time.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as in my invention:

1. The process for the purification of a gas mixture from its contained oxides of nitrogen which comprises contacting the gas mixture with a chromous compound whereby the oxides of nitrogen undergo a reduction reaction.

2. The process for the purification of a gas mixture from its contained oxides of nitrogen which comprises contacting the gas mixture with a chromous salt whereby the oxides of nitrogen undergo a reduction reaction.

3. The process for the purification of a gas mixture from its contained oxides of nitrogen which comprises contacting the gas mixture with a water-soluble chromous salt whereby the oxides of nitrogen undergo a reduction reaction.

4. The process for the purification of a gas mixture from its contained oxides of nitrogen which comprises contacting the gas mixture with a chromous salt of an inorganic acid whereby the oxides of nitrogen undergo a reduction reaction.

5. The process for the purification of a gas mixture from its contained oxides of nitrogen which comprises contacting the gas mixture with a water-soluble chromous salt of an inorganic acid whereby the oxides of nitrogen undergo a reduction reaction.

6. The process for the purification of a gas mixture from its contained oxides of nitrogen which comprises contacting the gas mixture with a solution of a chromous compound whereby the oxides of nitrogen undergo a reduction reaction.

7. The process for the purification of a gas mixture from its contained oxides of nitrogen which comprises contacting the gas mixture with a solution of a chromous salt whereby the oxides of nitrogen undergo a reduction reaction.

8. The process for the purification of a gas mixture from its contained oxides of nitrogen which comprises contacting the gas mixture with a solution of a water-soluble chromous salt whereby the oxides of nitrogen undergo a reduction reaction.

9. The process for the purification of a gas mixture from its contained oxides of nitrogen which comprises contacting the gas mixture with a solution of a chromous salt of an inorganic acid, whereby the oxides of nitrogen undergo a reduction reaction.

10. The process for the purification of a gas mixture from its contained oxides of nitrogen which comprises contacting the gas mixture with a solution of a water-soluble chromous salt of an inorganic acid whereby the oxides of nitrogen undergo a reduction reaction.

11. The process for the purification of a gas mixture from its contained oxides of nitrogen which comprises contacting the gas mixture with an aqueous solution of a chromous compound whereby the oxides of nitrogen undergo a reduction reaction.

12. The process for the purification of a gas mixture from its contained oxides of nitrogen which comprises contacting the gas mixture with an aqueous solution of a chromous salt whereby the oxides of nitrogen undergo a reduction reaction.

13. The process for the purification of a gas mixture from its contained oxides of nitrogen which comprises contacting the gas mixture with an aqueous solution of a chromous salt of an inorganic acid whereby the oxides of nitrogen undergo a reduction reaction.

14. The process for the purification of a gas mixture from its contained oxides of nitrogen which comprises contacting the gas mixture with an aqueous neutral solution of a chromous compound whereby the oxides of nitrogen undergo a reduction reaction.

15. The process for the purification of a gas mixture from its contained oxides of nitrogen which comprises contacting the gas mixture with an aqueous neutral solution of a chromous salt whereby the oxides of nitrogen undergo a reduction reaction.

16. The process for the purification of a gas mixture from its contained oxides of nitrogen which comprises contacting the gas mixture with an aqueous neutral solution of a chromous salt of an inorganic acid whereby the oxides of nitrogen undergo a reduction reaction.

17. The process for the purification of a gas mixture from its contained oxides of nitrogen which comprises contacting the gas mixture with an aqueous acidified solution of a chromous salt whereby the oxides of nitrogen undergo a reduction reaction.

18. The process for the purification of a gas mixture from its contained oxides of nitrogen which comprises contacting the gas mixture with an aqueous acidified solution of a chromous salt of an inorganic acid whereby the oxides of nitrogen undergo a reduction reaction.

19. The process for the purification of a gas mixture from its contained oxides of nitrogen which comprises contacting the gas mixture with an aqueous alkaline solution of a chromous compound whereby the oxides of nitrogen undergo a reduction reaction.

20. The process for the purification of a gas mixture from its contained oxides of nitrogen which comprises contacting the gas mixture with a chromous compound in the solid phase whereby the oxides of nitrogen undergo a reduction reaction.

In testimony whereof, I have hereunto set my hand.

FRANKLIN A. BENT.